United States Patent [19]
Speakman

[11] 3,779,127
[45] Dec. 18, 1973

[54] STRESS COINING BOLT

[75] Inventor: Eugene R. Speakman, Fullerton, Calif.

[73] Assignee: McDonnell Douglas Corporation, Santa Monica, Calif.

[22] Filed: Sept. 2, 1971

[21] Appl. No.: 177,326

[52] U.S. Cl............................ 85/7, 85/1 R, 85/9 R, 151/41.73, 287/189.36 R
[51] Int. Cl............................................. F16b 19/05
[58] Field of Search.................... 85/1 R, 5 R, 7, 37; 151/41.73; 287/189.36 F

[56] References Cited
UNITED STATES PATENTS

| | | | |
|---|---|---|---|
| 3,139,786 | 7/1964 | Ardell | 85/7 |
| 2,531,048 | 11/1950 | Huck | 85/5 |
| 3,630,253 | 12/1971 | Sherman | 151/41.73 |
| 3,661,406 | 5/1972 | Mele | 151/41.73 |
| 1,425,122 | 8/1922 | McKechnie et al. | 29/95.1 |
| 2,016,610 | 10/1935 | Moeller | 85/1 R |
| 3,561,102 | 2/1971 | Diemer | 85/37 |
| 2,972,274 | 2/1961 | Bombard et al. | 85/5 |
| 3,578,367 | 5/1971 | Harvill | 287/189.36 F |

*Primary Examiner*—Edward C. Allen
*Attorney*—Walter J. Jason et al.

[57] ABSTRACT

A bolt for minimizing the stress concentration generated by an aperture in metallic structure. The bolt includes a hard and rigid elongated shaft adapted for forcible insertion through the aperture. The shaft is provided with a plurality of different diameter annular protuberances at one end and a bolt head at the other. The largest protuberance is usually closest to the bolt head and has a diameter of a predetermined relationship to the diameter of the aperture so that upon forced insertion therethrough, the material forming the wall of the aperture is plastically displaced radially outward substantially one-half the difference between the diameter of the largest protuberance and the original diameter of the aperture. The length of the shaft between the largest protuberance and the bolt head may be just less than the depth of the aperture so that radii on the bolt head and on the last protuberance additionally stress the edges of the aperture to further improve the fatigue strength of the metallic structure.

5 Claims, 4 Drawing Figures

PATENTED DEC 18 1973 3,779,127

STRESS COINING BOLT

CROSS-REFERENCE TO A RELATED PATENT AND APPLICATION

This application relates to the subject matter of U. S. Pat. No. 3,434,327, entitled STRESS COINING by Eugene R. Speakman and U. S. Pat. application Ser. No. 25,288, entitled STRESS COINING TOOL also by Eugene R. Speakman and filed Apr. 2, 1970, and now abandoned both of which are assigned to Applicant's assignee and reference is made to the information therein as though fully set forth hereinbelow.

BACKGROUND OF THE INVENTION

In many types of structural members it is a requirement to know what force can be applied to the member before the member will fail or yield. Such a yield point can be easily calculated when the members are under static load conditions. However, when a member is constantly subjected to fluctuating loads where the fluctuations establish some sort of definite pattern, a different kind of failure is applicable, such being defined as fatigue failure. A fatigue failure is usually a gradual or progressive fracture. The fracture starts at some point in the structural member, usually where the variations in stress are much larger than anticipated. This high localized stress fluctuation causes a small crack which then gradually separates until the entire member breaks without measurable yielding. It is well known that in this type of failure, the inclusion of an aperture such as a drilled hole for the insertion of a fastening member creates an area in which high localized stress fluctuations are present during flexure of the member. It is therefore desirable to modify the aperture in some manner whereby the high localized stres fluctuations can either be substantially reduced or eliminated.

In aircraft, during flight, the wing structures and fuselage structural members are subjected constantly to this type of fatigue. The wind turbulance coupled with the aircraft maneuvers causes a cyclic movement of practically all the structural supporting members within the aircraft. As such members usually contain apertures for the insertion of fastening means, the high localized stress created by the apertures greatly compounds the the fatigue failure problem in aircraft structures. One answer to the problem can be found in the above-referenced U. S. Pat. No. 3,434,327 which describes a method to cold-work the material around an aperture to create residual compressive stresses in the area of the aperture which tend to counteract any stress fluctuation which might cause failure of the structural member. The displacement of the material by the stress coining method must be within a certain range in order to accomplish the desired results. Insufficient material displacement does not create sufficient residual compressive stresses while excess material displacement reduces the proportional rebound of the material and therefore also does not create the maximum value of residual compressive stress in the aperture wall. It has been found through experimentation that a rebound of approximately one-half the value of the total material displacement is most satisfactory.

SUMMARY OF THE INVENTION

The present stress coining bolt is an improvement to those embodiments shown in the above referenced patent application, Ser. No. 25,288, entitled STRESS COINING TOOL. The present bolt comprises a substantially rigid, hard, elongate article having a bolt head portion on one end and at least two annular protuberances located near the opposite end. The largest annular protuberance has a diameter of such relationship to the diameter of the aperture that upon a forced insertion thereof through the aperture, the material forming the wall of the aperture is displaced radially substantially the difference between the diameter of the largest annular protuberance and the diameter of the aperture. The plastic material displacement is such that thereafter free rebound would be approximately one-half of the total material displacement. All of the free rebound does not occur, however, because a shaft portion between the bolt head and the protuberances is sized for a predetermined interference fit with the expanded wall. The surfaces of the member adjacent the aperture may be additionally deformed by a contoured undersurface of the bolt head and the back surface of the annular protuberance adjacent the shaft portion. Ridges are formed between the protuberances and the end of the bolt. These ridges in combination with the specially shaped protuberances enable the fastening of an anchoring member thereto for retaining the bolt within the aperture. The bolt therefore, stress coins the aperture, establishes a controlled interference fit with the aperture and fastens the portions of the structural member in one operation.

It is therefore an object of the present invention to provide a fastener for stress coining apertures in which the fastener is to remain.

Another object is to provide a stress coining bolt which can be used without generating substantial quantities of scrap.

Another object is to provide a fastener to improve the fatigue life of structural members through which it is inserted.

Another object is to provide a fastener which stress coins both the interior of an aperture through which it is driven and the surfaces of the structural member adjacent the aperture.

Another object is to provide a stress coining fastener which can be easily constructed from high strength materials.

These and other objects and advantages of the present invention will become apparent after considering the following detailed specification which covers preferred embodiments thereof in conjunction with the accompanying drawing wherein:

DESCRIPTION OF THE PRESENT EMBODIMENT

Figure 1:
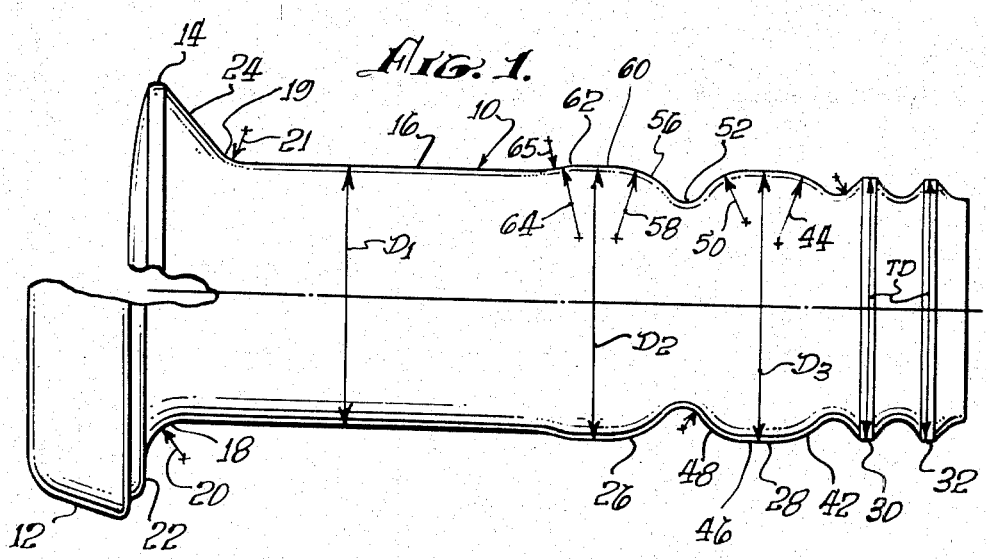
FIG. 1 is an enlarged and exaggerated representation of a fastener constructed according to the present invention with alternate protruding and countersunk heads partially shown.

Referring to the drawing more particularly by reference numbers, number 10 in FIG. 1 denotes a stress coining stump bolt constructed according to the present invention. The bolt 10 includes a bolt head suitable for the intended use such as the protruding head 12 or the countersunk head 14. Whatever type of bolt head, 12 or 14, is included, it is preferable that the juncture 18 or 19 between the bolt head, 12 or 14 respectively, and the shaft 16 of the bolt 10 has a radius 20 or 21 which is provided to stress coin the surface about the aperture through which the bolt 10 is to be driven.

Figures 2, 3, 4:
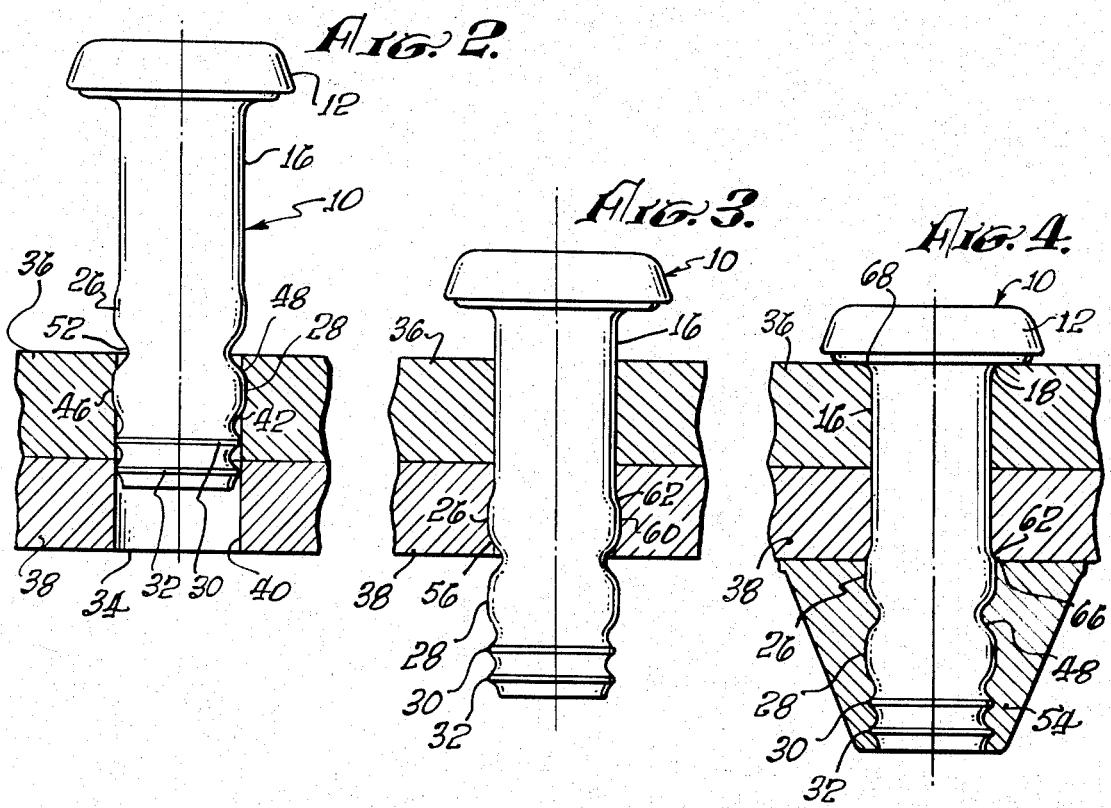
FIG. 2 shows a protruding head fastener of FIG. 1 partially driven through aligned apertures in structural members to be held together.
FIG. 3 shows the fastener of FIG. 2 almost completely driven into the aligned apertures.
FIG. 4 shows the fastener of FIG. 2 in its final position with an anchoring member swaged thereon.

The shaft 16 extends between the underside 22 or 24 of the bolt head 12 or 14 to a stress coining annular protuberance 26. The bolt 10 also includes at least one other stress coining annular protuberance 28 and means such as ridges 30 and 32 which are adapted to allow the fastening of an anchoring member thereon. The diameter TD of the ridges 30 and 32 is usually sized to just fit within the aperture 34 through which the bolt 10 is driven as shown in FIG. 2. In some applications where a removable nut is to be used, threads are provided in place of the ridges 30 and 32.

When the bolt 10 is to be driven through an aperture 34 in one or more structural members 36 and 38, the bolt 10 is first lubricated with suitable lubricant such as cetyl alcohol. The bolt 10 is then placed in the aperture 34 and a rivet gun or suitable vibratory means are placed against the bolt head 12 or 14 to drive it through the aperture 34. Since the ridges 30 and 32 usually have a diameter just slightly smaller than the diameter of the aperture 34, they fit in easily. However, the first protuberance 28 is constructed of a diameter to expand the wall 40 of the aperture 34.

The wall 40 is expanded when it comes in contact with the front surface 42 of the protuberance 28. The front surface 42 is generally toroidal in shape having a predetermined cross-sectional radius 44 which enables the wall 40 to be smoothly expanded thereover with increasing mechanical advantage as the wall 40 is further expanded. Behind the surface 42 and smoothly faired thereto is a relatively flat cylindrical portion 46 of diameter $D_3$ which maintains the expansion of the wall 40 as the bolt 10 is being driven through the aperture 34 and assists in assuring that the bolt 10 goes straight through the aperture 34. The relatively flat cylindrical portion 46 is then smoothly faired into a generally toroidal back surface 48 of the protuberance 28 which has a cross-sectional radius 50 which is usually less than the radius 44. The back surface 48 of the protuberance 28 allows the aperture wall to smoothly elastically recover into a lubricant reservoir 52 formed between the two protuberances 26 and 28. This enables the aperture wall 40 to pick up lubricant for the stress coining operation by the next protuberance 26. The smaller radius 50 of the back surface 48 assists in the engagement with anchoring means 54 which will be discussed hereinafter.

Depending upon the relative sizes of the bolt 10 and the aperture 34, the passage of the initial protuberance 28 may or may not have exceeded the elastic limit of the aperture wall 40 to plastically deform it. However, the final annular protuberance 26 is always sized to plastically deform the aperture wall 40 outwardly so that the total plastic deformation caused by all of the protuberances is approximately equal to the elastic recovery thereof. In most materials, the total elastic and plastic expansion of the aperture wall 40 is substantial. Therefore, having the aperture wall 40 expanded in steps over a plurality of protuberances 26 and 28 is preferable to a one step expansion. The first protuberance 28, because of manufacturing tolerances in drilling and reaming apertures, usually is never called upon to do as much expansion work as later protuberances. The protuberance 28 is important, however, in that it prevents "ball and socketing" of the later protuberances which otherwise, even though they include cylindrical portions, might not pass smoothly through the aperture 34, thereby degrading the effect of the stress coining operation.

As the bolt 10 is driven further into the aperture 34, the front surface 56 of the last annular protuberance 26 again expands the re-lubricated aperture wall 40. The front surface 56 is generally toroidal having a predetermined cross-sectional radius 58 which is chosen to smoothly expand the wall 40 without galling or scraping the same. The final protuberance 26 like protuberance 28, also includes a relatively cylindrical portion 60 which is smoothly faired to the front surface 56. The cylindrical portion 60 has a diameter $D_2$ sufficient to assure the desired stress coining of the aperture wall 40 and, in addition, it assists in assuring the protuberance 26 passes smoothly through the aperture 34. It has been found through experimentation that stress coining protuberances such as protuberances 26 and 28 work best in aluminum if each increases the aperture diameter about two thousandths of an inch and therefore, $D_2$ is usually about two thousandths of an inch larger than $D_3$, the maximum diameter of the adjacent protuberance 28.

As shown in FIG. 3, as the final protuberance 26 passes through the aperture 34, the wall 40 thereof elastically expands smoothly down a back generally toroidal surface 62 of the protuberance 26 having a cross-sectional radius 64 similar to the radius 58 of the front surface 56. The back surface 62 is smoothly faired by another radius 65 into the shaft 16 which has a diameter $D_1$ chosen to form a predetermined interference fit with the stress coined aperture wall 40. As shown in FIG. 4, the final protuberance 26 cannot be completely driven through the structural members 36 and 38 since the length of the shaft 16 is preferably so sized to the thickness of the members 36 and 38. The back surface 62 of the final protuberance 26 therefore maintains a greater interference in the area 66 of the structural member 38 adjacent the end of the aperture 34 to provide improved fatigue characteristics. The aforementioned juncture 18 or when a countersunk head 14 is used, juncture 19 does the same thing to the area 68 of the structural member 36 adjacent the bolt head 12 and the aperture 34.

The back surface 62 of the final protuberance 26 also performs another function and that is to assist in the establishment of a predetermined tensile stress in the bolt 10 itself. The bolt 10 is usually driven into the aperture 34 by vibratory means such as a rivet gun. As the bolt 10 is driven in as far as possible, as determined by the underside 22 of the bolt head 12, the wedging action of the back surface 62 and the vibration generated by the rivet gun tend to move the protuberance 26 further through the aperture 34 to establish a preload in the shaft 16 which maintains the two structures 36 and 38 tightly together.

Once the bolt 10 has been driven through the aperture 34 as far as the underside 22 of the bolt head 12 will allow, anchoring means 54 such as an aluminum collar are swaged on the portion of the bolt 10 including the ridges 30 and 32, the protuberance 28 and a portion of the protuberance 26 which extends out of the structure 38. The swaging of the means 54 onto the bolt 10 produces a permanent fastener assembly. The swaging operation in combination with the smaller radius 50 on the back surface 48 of the initial protuberance 28 also assists in the establishment of the desired preload tension in the bolt 10.

Bolts such as bolt 10 are usually constructed from expensive materials such as high strength steels or titanium. Therefore there is an economic advantage in constructing a stump type rather than pull type stress coining bolt, with pull types being those kinds with a pulling stem which breaks off during the swaging of the anchoring means 54. The economic advantage emerges because pull type bolts including stress coining means have almost a 50 percent scrap factor, the pulling stem being discarded once it breaks off. Since the cost of raw material makes up a substantial percentage of the cost of such high strength bolts, the elimination of the pulling stem results in almost a 50 percent cost saving in their manufacture and use.

The bolts 10, no matter what their head configuration, are easily constructed using conventional cold-rolling techniques to produce a bolt having a hard and smooth surface finish and relatively accurate dimensions. When alloy steel is used to construct such bolts 10, they are usually plated with a corrosive resistant material such as .0004 to .0008 inch thick cadmium. When the bolts 10 are constructed from titanium alloy no plating is usually required. The dimensions, in inches, of typical bolts 10 constructed according to the present invention are shown in the following table.

TABLE

| NOM thread size | $D_1$ dia. unplated | $D_1$ dia. plated Before plate | $D_1$ dia. plated After plate | $D_2$ dia. +.0005/-.0000 unplated or before plate | $D_3$ dia. ±.0005/-.0000 unplated or before plate |
| --- | --- | --- | --- | --- | --- |
| .1900-32 | .1940 .1935 | .1932 .1926 | .1940 .1930 | .1950 | .1930 |
| .2500-28 | .2540 .2535 | .2532 .2526 | .2540 .2530 | .2550 | .2530 |
| .3125-24 | .3165 .3160 | .3157 .3151 | .3165 .3155 | .3175 | .3155 |
| .3750-24 | .3795 .3790 | .3787 .3781 | .3795 .3785 | .3810 | .3790 |
| .4375-20 | .4325 .4320 | .4317 .4311 | .4325 .4315 | .4345 | .4325 |
| .5000-20 | .5050 .5045 | .5042 .5036 | .5050 .5040 | .5070 | .5050 |
| .5625-18 | .5675 .5670 | .5667 .5661 | .5675 .5665 | .5695 | .5675 |
| .6250-18 | .6300 .6295 | .6292 .6286 | .6300 .6290 | .6320 | .6300 |

Thus there has been shown and described novel stress coining bolts which fulfill all of the objects and advantages sought therefor. Many changes, alterations, modifications and other uses and applications of the subject stress coining bolts will become apparent after considering this specification and the accompanying drawing. All such changes, modifications, variations and other uses and applications which do not depart from the spirit and scope of the invention are deemed to be covered by the invention which is limited only by the claims which follow.

What is claimed is:

1. A fastener for increasing the fatigue strength of metallic members having apertures defined by aperture walls therethrough and for retaining said metallic members together; said fastener including:
   a substantially rigid elongate generally cylindrical shaft of a predetermined diameter having first and second opposite ends;
   a fastener head connected to said first end of said shaft; and
   stress coining means connected to said second end of said shaft, said stress coining means including at least two annular protuberances, each of said protuberances having a front generally toroidal surface for contact and expanding the aperture wall as said fastener is driven second end first through the apertures, a cylindrical surface smoothly faired into said front generally toroidal surface and a back generally toroidal surface smoothly faired into said cylindrical surface, said annular protuberances having predeterminately graduated maximum diameters, the protuberance with the largest maximum diameter being closest to said shaft, said largest maximum diameter being larger than said predetermined diameter, said back generally toroidal surface of said annular protuberance closest to said shaft being faired into the surface of said shaft by a smooth curved surface, whereby said smooth curved surface is for stressing the end of the aperture through which the fastener is driven to improve the fatigue strength of the metallic member, said annular protuberance located furthest from said shaft having a back generally toroidal surface with a cross-sectional radius which is smaller than the cross-sectional radius of said front generally toroidal surface thereof, said stress coining means further including at least one ridge spaced from said protuberances and said shaft, whereby said ridge and said back generally toroidal surface of small cross-sectional radius enable an anchoring member to gain purchase thereon.

2. The fastener defined in claim 1 wherein said fastener head includes:
   an abutment surface at an angle to said shaft for limiting the depth that said fastener can be driven through said metallic members; and
   a concave surface of a predetermined radius to smoothly fair said abutment surface to said shaft, whereby said concave surface is for stressing the end of the aperture through which the fastener is driven to improve the fatigue strength of the metallic member.

3. The fastener defined in claim 1 wherein said stress coining means include:
   at least one concave surface connecting the back generally toroidal surface of one protuberance with the front generally toroidal surface of a second adjacent protuberance so that a lubricant reservoir is formed between the adjacent protuberances to provide lubricant for the aperture wall as it is expanded by said second protuberance.

4. The fastener defined in claim 1 including:
   an anchoring member swaged over a portion of said stress coining means for retaining said fastener in the metallic members.

5. The fastener defined in claim 2 wherein said fastener is constructed of titanium alloy.

* * * * *